(12) United States Patent
Chang et al.

(10) Patent No.: US 11,581,797 B2
(45) Date of Patent: Feb. 14, 2023

(54) MULTIPLE OUTPUTS UNIVERSAL SERIAL BUS TRAVEL ADAPTOR AND CONTROL METHOD THEREOF

(71) Applicant: Richtek Technology Corporation, Zhubei (TW)

(72) Inventors: Wei-Hsu Chang, Hsinchu (TW); Shih-Jen Yang, New Taipei (TW); Yi-Wei Lee, Taipei (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/680,245

(22) Filed: Feb. 24, 2022

(65) Prior Publication Data

US 2022/0271645 A1    Aug. 25, 2022

Related U.S. Application Data

(60) Provisional application No. 63/153,405, filed on Feb. 25, 2021.

(30) Foreign Application Priority Data

Jan. 21, 2022   (TW) .................................. 111102669

(51) Int. Cl.
*H02M 1/00* (2006.01)
*H02M 3/155* (2006.01)
*H02M 3/335* (2006.01)

(52) U.S. Cl.
CPC ......... *H02M 1/0067* (2021.05); *H02M 3/155* (2013.01); *H02M 3/335* (2013.01)

(58) Field of Classification Search
None
See application file for complete search history.

(56) References Cited

U.S. PATENT DOCUMENTS

| | | | |
|---|---|---|---|
| 9,960,686 B2* | 5/2018 | Yu | H02M 7/04 |
| 11,061,457 B1* | 7/2021 | Bhattacharjee | G06F 1/3215 |
| 11,221,658 B2* | 1/2022 | Yeh | H02M 3/24 |
| 11,463,012 B1* | 10/2022 | Liu | H02M 1/007 |
| 2020/0303939 A1* | 9/2020 | Perry | H02J 7/007186 |
| 2022/0115884 A1* | 4/2022 | Wang | H02M 1/008 |
| 2022/0137688 A1* | 5/2022 | Wang | G06F 13/4282 713/300 |
| 2022/0166230 A1* | 5/2022 | Tseng | H02J 7/00041 |
| 2022/0271556 A1* | 8/2022 | Tang | H02J 7/0063 |
| 2022/0285955 A1* | 9/2022 | Koo | H02J 3/1821 |

* cited by examiner

*Primary Examiner* — Jeffery S Zweizig
(74) *Attorney, Agent, or Firm* — Tung & Associates

(57) ABSTRACT

A multiple output universal serial bus travel adaptor includes: at least one AC-DC converter for converting an AC power to a first DC power; at least one DC-DC converter for providing a second DC power according to the first DC power; plural switches which are coupled to the AC-DC converter and/or the DC-DC converter to provide the first DC power or the second DC power to corresponding connectors according to operation signals; and a protocol controller configured to generate the operation signals according to at least one of the following parameters: a) the types of the connectors; b) whether there is a mobile device connected with the connectors; c) a first command from the mobile device; d) the power consumed by the mobile devices; e) the currents flowing through the connectors; and f) the voltages at the connectors.

14 Claims, 10 Drawing Sheets

| situation | Connector 203a | Connector 203b | Standby status |
|---|---|---|---|
| 1 | Type C | Type C | AC-DC converter is turned on, and DC-DC converter is turned off |
| | | | Connector 203a is disconnected, and switches SW11 and SW12 are off |
| | | | Connector 203b is disconnected, and switches SW21 and SW22 are off |
| 2 | Type C | Type A | AC-DC converter provides 5V, and DC-DC converter is turned off |
| | | | Connector 203a is disconnected, and switches SW11 and SW12 are off |
| | | | Connector 203b outputs 5V, and switch SW21 is on, and switch SW22 is off |
| 3 | Type A | Type C | AC-DC converter provides 5V, and DC-DC converter is turned off |
| | | | Connector 203a outputs 5V, and switch SW11 is on, and switch SW12 is off |
| | | | Connector 203b is disconnected, and switches SW21 and SW22 are off |
| 4 | Type A | Type A | |
| 4.1 | | | AC-DC converter provides 5V, and DC-DC converter is turned off |
| | | | Connector 203a outputs 5V, and switch SW11 is on, and switch SW12 is off |
| | | | Connector 203b outputs 5V, and switch SW21 is on, and switch SW22 is off |
| 4.2 | | | AC-DC converter provides 5V, and DC-DC converter provides 5V |
| | | | Connector 203a outputs 5V, and switch SW11 is on, and switch SW12 is off |
| | | | Connector 203b outputs 5V, and switch SW21 is off, and switch SW22 is on |

Fig. 6

| situation | condition | Connector 203a | Connector 203b | status |
|---|---|---|---|---|
| 1 | Both unplugged | | | |
| | | unplugged | unplugged | Disable DC-DC converter<br><br>Switches SW11, SW12, SW21 and SW22 are off |
| 2 | One plugged | | | |
| 2.1 | | plugged | unplugged | Disable DC-DC converter<br><br>Switches SW11 is on, and switches SW12, SW21 and SW22 are off |
| 2.2 | | unplugged | plugged | Disable DC-DC converter<br><br>Switch SW21 is on, and switches SW11, SW12 and SW22 are off |
| 3 | Both plugged | | | |
| 3.1 | | High voltage | Low voltage | Enable DC-DC converter<br><br>Switches SW11 and SW22 are on, and switches SW12 and SW21 are off |
| 3.2 | | Low voltage | High voltage | Enable DC-DC converter<br><br>Switches SW12 and SW21 are on, and switches SW11 and SW22 are off |

Fig. 7

MULTIPLE OUTPUTS UNIVERSAL SERIAL BUS TRAVEL ADAPTOR AND CONTROL METHOD THEREOF

CROSS REFERENCE

The present invention claims priority to U.S. 63/153,405 filed on Feb. 25, 2021 and claims priority to TW 111102669 filed on Jan. 21, 2022.

BACKGROUND OF THE INVENTION

Field of Invention

The present invention relates to a multiple output universal serial bus travel adaptor and a control method thereof, and particularly to such a multiple output universal serial bus travel adaptor which can dynamically adjust electrical connections among an AC-DC converter, a DC-DC converter and connectors, and a control method thereof)

Description of Related Art

Please refer to FIG. 1, which illustrates a schematic circuit diagram of a conventional multiple output universal serial bus travel adapter 10. This prior art employs an AC-DC converter 101 and a DC-DC converter 102. The AC-DC converter 101 and the DC-DC converter 102 correspond to different protocol controllers 104a and 104b, respectively. Because the output of the AC-DC converter 101 is directly coupled to the connector 103a, the power delivery efficiency through the connector 103a is better, but the power delivery efficiency through the connector 103b is poor. Therefore, if only one mobile device is to be charged, the mobile device should be connected with the connector 103a for better efficiency. However, if the user does not connect the one mobile device with the connector 103a, or, if there are two mobile devices and the mobile device which consumes more power than the other is connected with the connector 103b rather than the connector 103a, then it is not optimum and the total efficiency of this conventional multiple output universal serial bus travel adapter 10 will be poor.

In view of the above prior art, the present invention proposes a multiple output universal serial bus travel adaptor and a control method thereof which can dynamically adjust electrical connections among an AC-DC converter, a DC-DC converter and connectors, for optimum efficiency.

SUMMARY OF THE INVENTION

In one aspect, the present invention provides a multiple output universal serial bus travel adaptor including: at least one AC-DC converter, wherein the AC-DC converter is configured to operably convert an AC power to a first DC power; at least one DC-DC converter coupled to the AC-DC converter, wherein the DC-DC converter is configured to operably provide a second DC power according to the first DC power; a plurality of connectors which are configured to operably receive the first DC power or the second DC power, so as to provide an output power to at least one mobile device connected with at least one of the connectors; a plurality of switches which are coupled to the at least one AC-DC converter and/or the at least one DC-DC converter and are configured to operably provide the first DC power or the second DC power to the corresponding connectors according to corresponding operation signals; and a protocol controller coupled to the switches, wherein the protocol controller is configured to operably generate the operation signals according to at least one of the following parameters so as to operate the plural switches, and to determine electrical connection relationships between the first DC power and the connectors and between the second DC power and the connectors: a) types of the connectors; b) whether there is a mobile device connected with the connector; c) a first command from the at least one mobile device; d) power consumed by the at least one mobile device; e) currents flowing through the connectors; and f) voltages at the connectors; wherein the AC-DC converter provides an internal power for the DC-DC converter.

In one embodiment, the connectors are Type-A universal serial bus or Type-C universal serial bus.

In one embodiment, the AC-DC converter includes a flyback converter.

In one embodiment, the DC-DC converter includes a step-down converter or a step-up/down converter.

In one embodiment, the protocol controller is further configured to operably control the AC-DC converter to dynamically adjust the first DC power according to a second command from the at least one mobile device.

In one embodiment, the protocol controller is further configured to operably control the DC-DC converter to dynamically adjust the second DC power according to a third command from the at least one mobile device.

In one embodiment, the protocol controller is integrated in the AC-DC converter or the DC-DC converter.

In one embodiment, the protocol controller is further configured to operably generate a reset signal to operate the switches, so as to adjust an output voltage of the output power to a predetermined level or 0V during a reset time period before the electrical connection relationships between the first DC power and the connectors and between the second DC power and the connectors are determined.

In another aspect, the present invention provides a control method of a multiple output universal serial bus travel adapter, the control method including: converting an AC power to a first DC power; providing a second DC power according to the first DC power; providing a plurality of connectors which are configured to operably receive the first DC power or the second DC power, so as to provide an output power to at least one mobile device connected with at least one of the connectors; operating a plurality of switches according to corresponding operation signals, so as to provide the first DC power or the second DC power to the corresponding connectors; and generating the operation signals according to at least one of the following parameters so as to operate the switches, and to determine electrical connection relationships between the first DC power and the connectors and between the second DC power and the connectors: a) types of the connectors; b) whether there is a mobile device connected with the connector; c) a first command from the at least one mobile device; d) power consumed by the at least one mobile device; e) currents flowing through the connectors; and f) voltages at the connectors;

In one embodiment, the step of providing a second DC power according to the first DC power includes a step-down conversion step or a step-up/down conversion step.

In one embodiment, the control method further includes: converting the AC power to generate the first DC power according to a second command from the at least one mobile device, so as to dynamically adjust the first DC power.

In one embodiment, the control method further includes: converting the first DC power to generate the second DC power according to a third command from the at least one mobile device, so as to dynamically adjust the second DC power.

In one embodiment, the control method further includes: generating a reset signal to operate the plural switches, so as to adjust an output voltage of the output power to a predetermined level or 0V during a reset time period before the electrical connection relationships between the first DC power and the connectors and between the second DC power and the connectors are determined.

The present invention has such an advantage that the multiple output universal serial bus travel adapter and the control method thereof of the present invention can achieve optimum efficiency at any hardware configuration under any operation conditions by dynamically adjusting the electrical connection relationships among the AC-DC converter, the DC-DC converter and the connectors.

The objectives, technical details, features, and effects of the present invention will be better understood with regard to the detailed description of the embodiments below.

BRIEF DESCRIPTION OF THE DRAWINGS

FIG. 6 illustrates output configuration of a multiple output universal serial bus travel adapter in a standby status in different hardware configurations in accordance with one embodiment of the present invention.

FIG. 7 illustrates operation arrangements of a multiple output universal serial bus travel adapter in accordance with one embodiment of the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
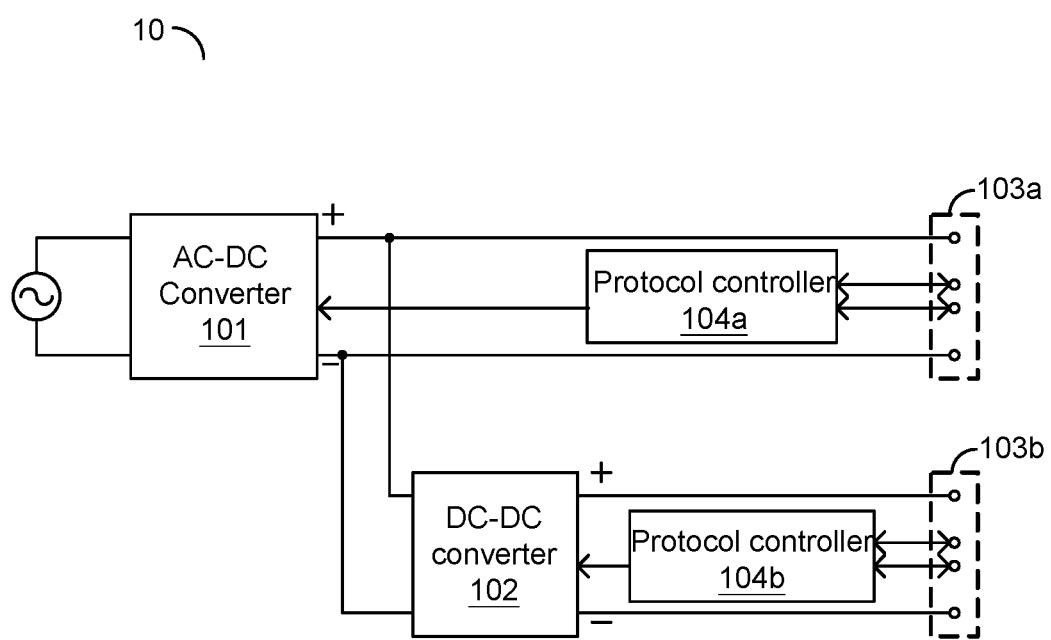
FIG. 1 illustrates a schematic circuit diagram of a conventional multiple output universal serial bus travel adapter.
Figure 2:
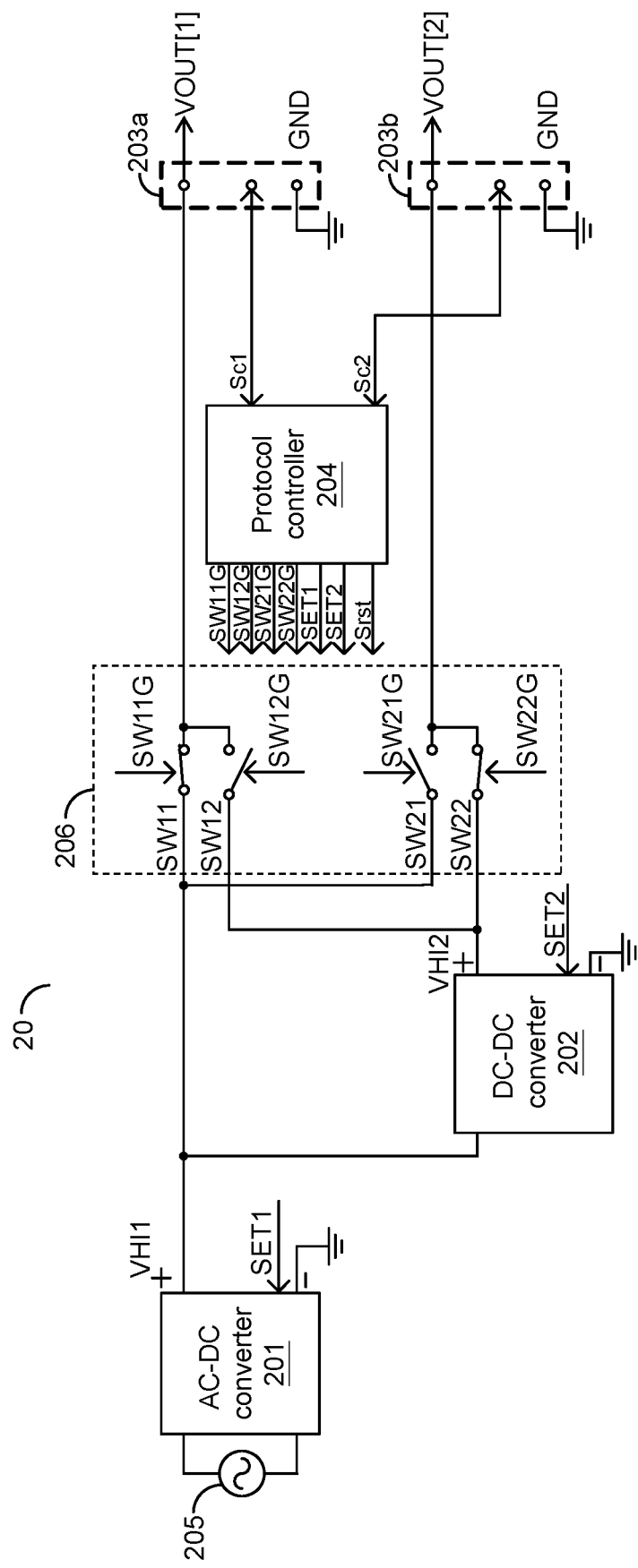
FIG. 2 illustrates a schematic circuit diagram of a multiple output universal serial bus travel adapter in accordance with one embodiment of the present invention.

FIG. 2 illustrates a schematic circuit diagram of a multiple output universal serial bus travel adapter in accordance with one embodiment of the present invention. As shown in FIG. 2, the multiple output universal serial bus travel adapter 20 of the present invention includes at least one AC-DC converter 201, at least one DC-DC converter 202, plural connectors 203a and 203b, a protocol controller 204 and plural switches 206. The AC-DC converter 201 is configured to operably convert an AC power 205 to a first DC power VHI1; the at least one DC-DC converter 202 is coupled to the AC-DC converter 201 and is configured to operably provide a second DC power VHI2 according to the first DC power VHI1.

The connector 203a and 203b are configured to operably receive the first DC power VHI1 or the second DC power VHI2, so as to provide an output voltage VOUT[1] or VOUT[2] of an output power to a mobile device connected with the connector 203a or 203b. The plural switches 206 are coupled to the at least one AC-DC converter 201 and/or the at least one DC-DC converter 202 and are coupled to the plural connectors 203a and 203b. The plural switches 206 include, for instance but not limited to, the switch SW11, the switch SW12, the switch SW21 and the switch SW22. The switch SW11, the switch SW12, the switch SW21 and the switch SW22 are configured to operably provide the first DC power VHI1 or the second DC power VHI2 to the corresponding connectors 203a and 203b according to operation signals SW11G, SW12G, SW21G and SW22G respectively.

The protocol controller 204 is coupled to the plural switches 206 and is configured to operably generate the plural operation signals SW11G, SW12G, SW21G and SW22G according to at least one of the following parameters so as to operate the plural switches 206, and to determine electrical connection relationships between the first DC power VHI1 and the connectors 203a and 203b and between the second DC power VHI2 and the connectors 203a and 203b: a) types of the connectors 203a and/or 203b; b) whether there is a mobile device connected with the connector 203a or 203b; c) a first command from the mobile device; d) power consumed by the mobile device; e) currents flowing through the connectors 203a and/or 203b; and f) voltages at the connectors 203a and/or 203b. The AC-DC converter 201 provides an internal power for the DC-DC converter 202.

In one embodiment, the protocol controller 204 is powered by the AC-DC converter 201. In one embodiment, the plural switches 206 are configured to operate in such a way that the connector connected with a mobile device which consumes more power and therefore requires higher voltage or larger current is coupled to the AC-DC converter 201. In one embodiment, when one mobile device requires higher voltage but consumes lower power while another mobile device requires lower voltage but consumes higher power, the plural switches 206 will operate to couple the mobile device which consumes higher power and requires low voltage to the AC-DC converter 201; in this case the DC-DC converter 202 may require to employ a step-up or step-up/down converter. A step-up converter converts a lower input voltage to a higher output voltage. A step-down converter converts a higher input voltage to a lower output voltage. A step-up/down converter can convert a lower input voltage to a higher output voltage and can also convert a higher input voltage to a lower output voltage.

Figure 9:
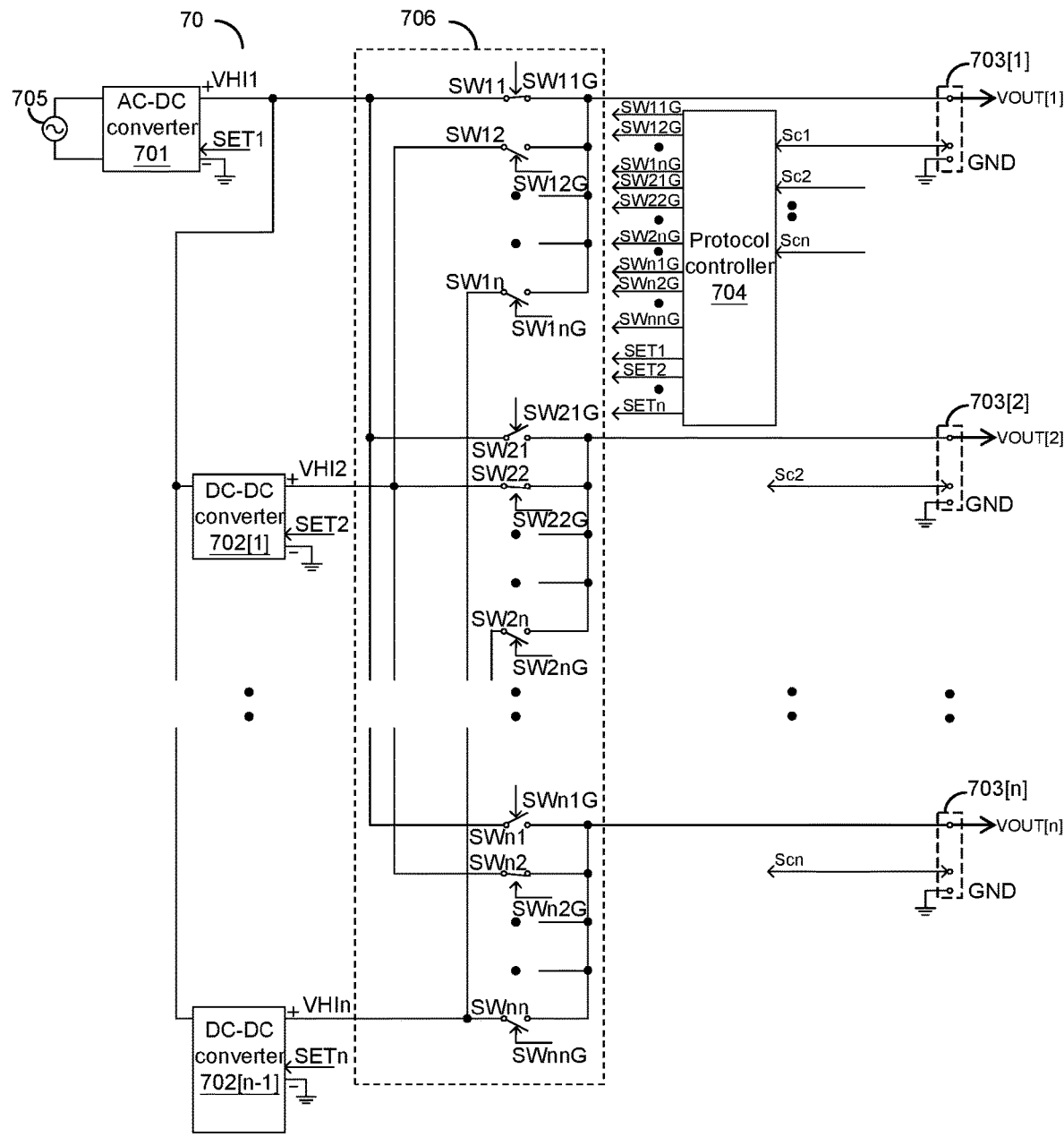
FIG. 9 illustrates a schematic circuit diagram of a multiple output universal serial bus travel adapter in accordance with still another embodiment of the present invention.
Figure 10:
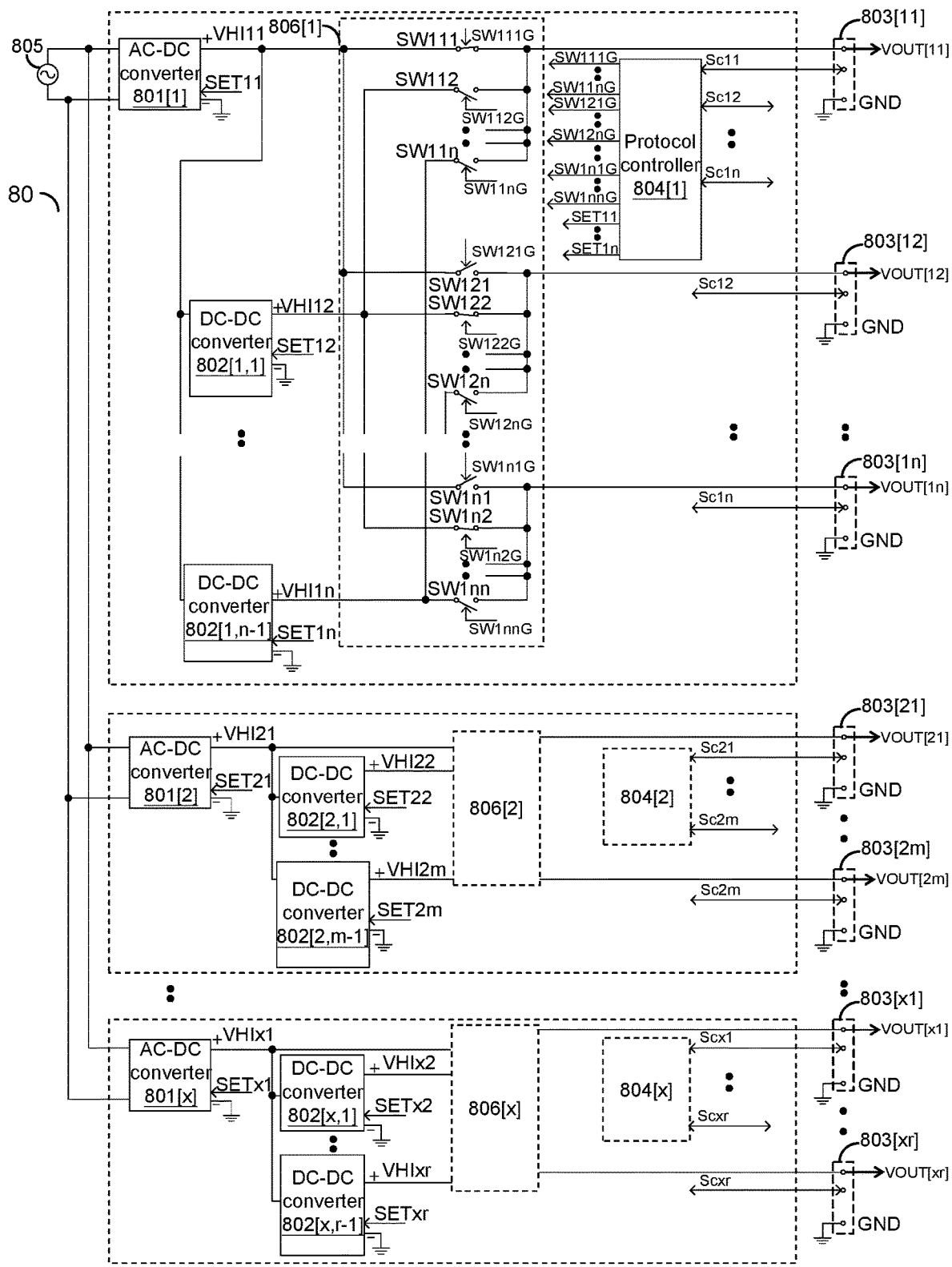
FIG. 10 illustrates a schematic circuit diagram of a multiple output universal serial bus travel adapter in accordance with yet another embodiment of the present invention.

In one embodiment, if the voltage provided by the AC-DC converter 201 is fixed, then it should first be determined as to whether the voltage required by the mobile device is what the AC-DC converter 201 can provide. Then, the connector connected with the mobile device which consumes more power among the one or more mobile devices whose voltage requirements meet what the AC-DC converter 201 can provide, is coupled to the AC-DC converter 201; on the other hand, the connector connected with the mobile device whose voltage requirement does not meet what the AC-DC converter 201 can provide, is coupled to the DC-DC converters 202. (This embodiment shows one mobile device coupled to the AC-DC converter 201 and one mobile device coupled to the DC-DC converters 202, but there can be plural mobile devices coupled to the AC-DC converter and plural mobile devices coupled to the DC-DC converters, for example as shown by the embodiments of FIGS. 9 and 10.) In one embodiment, the protocol controller 204 includes a set pin which is configured to operably generate a set signal SET1 according to a command from one or more of the mobile devices, so as to set the operation voltage of the AC-DC converter 201. In one embodiment, the protocol controller 204 includes a set pin which is configured to operably generate a set signal SET2 according to a command from one or more of the mobile devices, so as to set the operation voltage of the DC-DC converter 202.

In one embodiment, the connector 203a or 203b is Type-A universal serial bus or Type-C universal serial bus. In one embodiment, the type of the connector 203a or 203b can be determined by detecting the pin or from the internal setting of the protocol controller 204. In one embodiment, the pin may be a dedicated pin or a characteristic pin of Type-A or Type-C universal serial bus. In one embodiment, the AC-DC converter 201 includes a flyback converter. In one embodiment, the DC-DC converter 202 includes a step-down converter or a step-up/down converter.

In one embodiment, the protocol controller 204 is further configured to operably control the AC-DC converter 201 to dynamically adjust the first DC power VHI1, for instance the voltage or the current thereof, according to a second command from at least one of the mobile devices. In one embodiment, the protocol controller 204 is further configured to operably control the DC-DC converter 202 to dynamically adjust the second DC power VHI2, for example the voltage or the current thereof, according to a third command from at least one of the mobile devices. In one embodiment, at least a part of the first command, the second command and the third command can be transmitted via the communication signal Sc1 or Sc2, and the communication signal Sc1 or Sc2 can be received from the communication pin of the connector 203a or 203b. In one embodiment, the communication pin can be DP pin or DM pin. In another embodiment, the communication pin can be CC1 pin or CC2 pin. DP, DM, CC1 and CC2 pins have definitions and specifications defined by Type-C universal serial bus specification.

Figure 3:
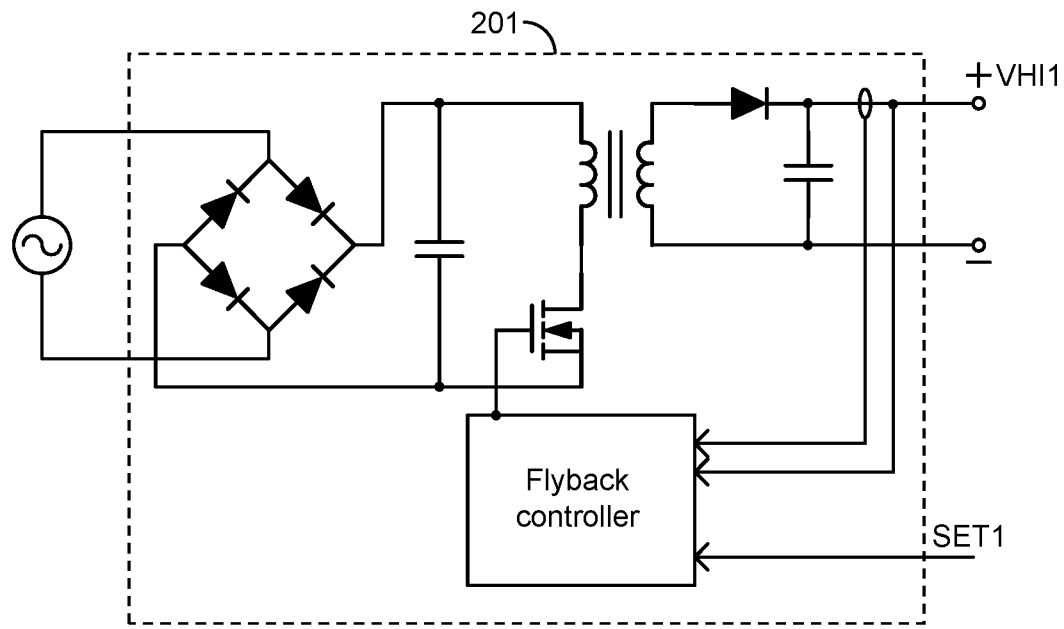
FIG. 3 illustrates a schematic circuit diagram of an AC-DC converter of a multiple output universal serial bus travel adapter in accordance with one embodiment of the present invention.
Figure 4:
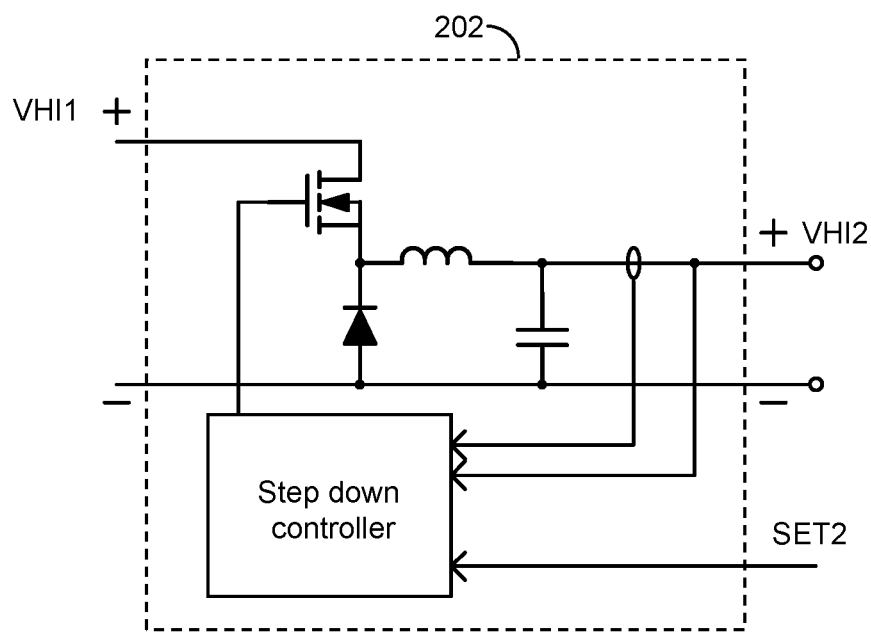
FIG. 4 illustrates a schematic circuit diagram of a DC-DC converter of a multiple output universal serial bus travel adapter in accordance with one embodiment of the present invention.

FIG. 3 illustrates a schematic circuit diagram of an AC-DC converter of a multiple output universal serial bus travel adapter in accordance with one embodiment of the present invention. FIG. 3 is an exemplary embodiment of the AC-DC converter 201 of the multiple output universal serial bus travel adapter 20 of the present invention. In this embodiment, the AC-DC converter 201 is a flyback converter. FIG. 4 illustrates a schematic circuit diagram of a DC-DC converter of a multiple output universal serial bus travel adapter in accordance with one embodiment of the present invention. FIG. 4 is an exemplary embodiment of the DC-DC converter 202 of the multiple output universal serial bus travel adapter 20 of the present invention. In this embodiment, the DC-DC converter 202 is a step-down converter.

Figure 5:
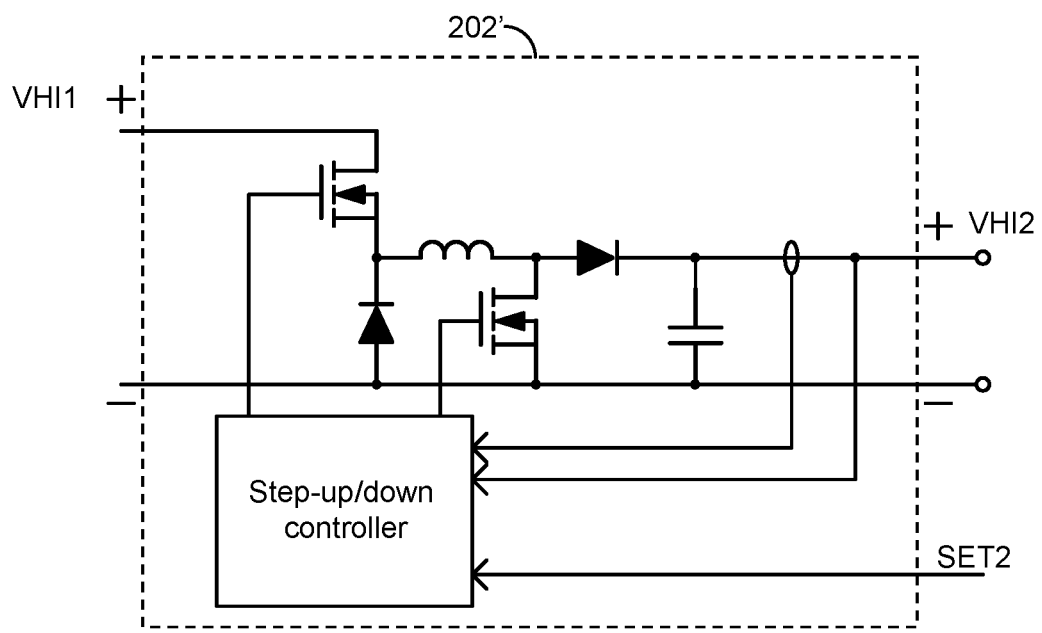
FIG. 5 illustrates a schematic circuit diagram of a DC-DC converter of a multiple output universal serial bus travel adapter in accordance with another embodiment of the present invention.

FIG. 5 illustrates a schematic circuit diagram of a DC-DC converter of a multiple output universal serial bus travel adapter in accordance with another embodiment of the present invention. FIG. 5 is another exemplary embodiment of the DC-DC converter 202' of the multiple output universal serial bus travel adapter 20 of the present invention. In this embodiment, the DC-DC converter 202' is a step-up/down converter.

FIG. 6 illustrates an output configuration of a multiple output universal serial bus travel adapter in a standby status in different hardware configurations in accordance with one embodiment of the present invention. Please refer to FIG. 6 and FIG. 2. When the types of the connectors 203a and 203b are both Type C, the AC-DC converter 201 is turned on and the DC-DC converter 202 is turned off. The connector 203a is disconnected and the switches SW11 and SW12 are both off, and, the connector 203b is disconnected and the switches SW21 and SW22 are both off. When the type of the connector 203a is Type C and the type of the connector 203b is Type A, the AC-DC converter 201 provides 5V and the DC-DC converter 202 is turned off. The connector 203a is disconnected and the switches SW11 and SW12 are both off, while, the connector 203b outputs 5V, the switch SW21 is on and the switch SW22 is off.

When the type of the connector 203a is Type A and the type of the connector 203b is Type C, the AC-DC converter 201 provides 5V and the DC-DC converter 202 is turned off. The connector 203a outputs 5V, the switch SW11 is on and the switch SW12 is off, while, the connector 203b is disconnected and the switches SW21 and SW22 are both off. When the types of the connectors 203a and 203b are both Type A, there are two situations. Situation 1: the AC-DC converter 201 provides 5V and the DC-DC converter 202 is turned off. The connector 203a outputs 5V, the switch SW11 is on and the switch SW12 is off, while, the connector 203b outputs 5V, the switch SW21 is on and the switch SW22 is off. Situation 2: the AC-DC converter 201 provides 5V and the DC-DC converter 202 provides 5V. The connector 203a outputs 5V, the switch SW11 is on and the switch SW12 is off, while, the connector 203b outputs 5V, the switch SW21 is off and the switch SW22 is on. Situation 1 is more efficient than Situation 2.

FIG. 7 illustrates operation arrangements of a multiple output universal serial bus travel adapter in accordance with one embodiment of the present invention. In this embodiment, the types of the connectors 203a and 203b are both Type C, the AC-DC converter 201 is a flyback converter and the DC-DC converter 202 is a step-down converter. Please refer to FIG. 7 and FIG. 2. When there is no mobile device connected to the connectors 203a and 203b, which is similar to the standby status of FIG. 6, the DC-DC converter 202 is disabled and the switches SW11, SW12, SW21, SW22 are all off.

When one of the connectors 203a and 203b is connected to a mobile device, if it is only the connector 203a that is connected to a mobile device, the DC-DC converter 202 is disabled, the switch SW11 is on, and the switches SW12, SW21 and SW22 are off. On the other hand, if it is only the connector 203b that is connected to a mobile device, the DC-DC converter 202 is disabled, the switch SW21 is on, and the switches SW11, SW12 and SW22 are off. When the connectors 203a and 203b are both connected to mobile devices, if the voltage of the connector 203a is higher, the DC-DC converter 202 is enabled, the switches SW11 and SW22 are on and the switches SW12 and SW21 are off. On the other hand, if the voltage of the connector 203b is higher, the DC-DC converter 202 is enabled, the switches SW12 and SW21 are on and the switches SW11 and SW22 are off.

Figure 8:
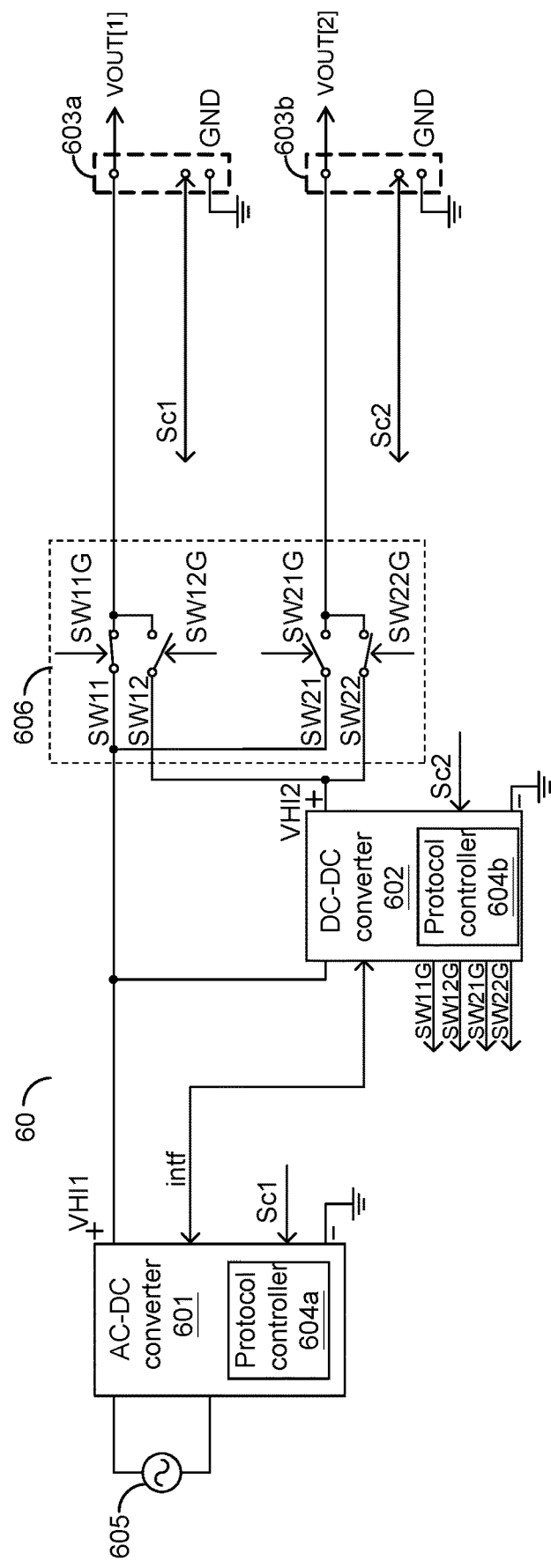
FIG. 8 illustrates a schematic circuit diagram of a multiple output universal serial bus travel adapter in accordance with another embodiment of the present invention.

FIG. 8 illustrates a schematic circuit diagram of a multiple output universal serial bus travel adapter in accordance with another embodiment of the present invention. In one embodiment, as shown in FIG. 8, the protocol controller 604a and 604b are integrated in the AC-DC converter 601 and the DC-DC converter 602 respectively. The AC-DC converter 601, the DC-DC converter 602, the plural connectors 603a, 603b, the AC power 605, the plural switches 606 of this embodiment are similar to the AC-DC converter 201, the DC-DC converter 202, the plural connectors 203a and 203b, the AC power 205, the plural switches 206 in the embodiment of FIG. 2, and therefore their detailed description is omitted. When the protocol controllers 604a and 604b are integrated in the AC-DC converter 601 and the DC-DC converter 602 respectively, one of the protocol controllers 604a and 604b is primary while the other is secondary and they communicate with each other through an interface intf in between. In the embodiment of FIG. 8, the protocol controller 604b in the DC-DC converter 602 is primary.

FIG. 9 illustrates a schematic circuit diagram of a multiple output universal serial bus travel adapter in accordance with still another embodiment of the present invention. The differences between this embodiment and the embodiment of FIG. 2 are that there are plural DC-DC converters 702[1]~702[n−1] which are coupled to the AC-DC converter 701 and are configured to operably provide second DC powers VHI2~VHIn respectively according to the first DC power VHI1. The connectors 703[1]~703[n] are configured to operably receive the first DC power VHI1 or the second DC powers VHI2~VHIn, so as to mobile devices connected with the connectors 703[1]~703[n].

The plural switches 706 include, for instance but not limited to, the switches SW11~SW1n, the switches SW21~SW2n and the switches SWn1~SWnn, wherein n is a positive integer which is larger than or equal to 2. The switches SW11~SW1n, the switches SW21~SW2n and the switches SWn1~SWnn are configured to operably provide the first DC power VHI1 or the second DC powers VHI2~VHIn to the corresponding connectors 703[1]~703[n] according to operation signals SW11G~SW1nG, SW21G~SW2nG and SWn1G~SWnnG respectively. The protocol controller 704 is configured to operably generate the plural operation signals SW11G~SW1nG, SW21G~SW2nG and SWn1G~SWnnG to operate the switches SW11~SW1n, SW21~SW2n and SWn1~SWnn, so as to determine electrical connection relationships between the first DC power VHI1 and the plural connectors 703[1]~703[n] and between the second DC powers VHI2~VHIn and the plural connectors 703[1]~703[n].

FIG. 10 illustrates a schematic circuit diagram of a multiple output universal serial bus travel adapter in accordance with yet another embodiment of the present invention. The differences between this embodiment and the embodiment of FIG. 2 are that there are plural DC-DC converters 802[1,1]~802[1,n−1] which are coupled to the AC-DC converter 801[1] and are configured to operably provide second DC powers VHI12~VHI1n respectively according to the first DC power VHI11, and there are DC-DC converters 802[2,1]~802[2,m−1] which are coupled to the AC-DC converter 801[2] and are configured to operably provide second DC powers VHI22~VHI2m respectively according to the first DC power VHI21. The DC-DC converters 802[x,1]~802[x,r−1] are coupled to the AC-DC converter 801[x] and are configured to operably provide second DC powers VHIx2~VHIxr respectively according to the first DC power VHIx1.

The connectors 803[11]~803[1n] are configured to operably receive the first DC power VHI11 or the second DC powers VHI12~VHI1n, so as to provide output voltages VOUT[11]~VOUT[1n] of output powers to mobile devices connected with the connectors 803[11]~803[1n]. The connectors 803[21]~803[2m] are configured to operably receive the first DC power VHI21 or the second DC powers VHI22~VHI2m, so as to provide output voltages VOUT[21]~VOUT[2m] of output powers to mobile devices connected with the connectors 803[21]~803[2m], wherein m is a positive integer which is larger than or equal to 2 . . . . The connectors 803[x1]~803[xr] are configured to operably receive the first DC power VHIx1 or the second DC powers VHIx2~VHIxr, so as to provide output voltages VOUT[x1]~VOUT[xr] of output powers to mobile devices connected with the connectors 803[x1]~803[xr], wherein r is a positive integer which is larger than or equal to 2.

The plural switches 806[1] include, for instance but not limited to, the switches SW111~SW11n, the switches SW121~SW12n and the switches SW1n1~SW1nn, wherein n is a positive integer which is larger than 1. The switches SW111~SW11n, the switches SW121~SW12n and the switches SW1n1~SW1nn are configured to operably provide the first DC power VHI11 or the second DC powers VHI12~VHI1n to the corresponding connectors 803[11]~803[1n] according to operation signals SW111G~SW11nG, SW121G~SW12nG and SW1n1G~SW1nnG respectively. The plural switches 806[2] are similar to the plural switches 806[1] and operate by a similar way, and the plural switches 806[x] are similar to the plural switches 806[1] and operate by a similar way.

The protocol controller 804[1] is configured to operably generate the plural operation signals SW111G~SW11nG, SW121G~SW12nG and SW1n1G~SW1nnG to operate the switches SW111~SW11n, SW121~SW12n and SW1n1~SW1nn, so as to determine electrical connection relationships between the first DC power VHI11 and the plural connectors 803[11]~803[1n] and between the second DC powers VHI12~VHI1n and the plural connectors 803[11]~803[1n]. In a similar way, the protocol controller 804[2] is configured to operably generate the plural operation signals (not shown) to operate the plural switches 806[2], so as to determine electrical connection relationships between the first DC power VHI21 and the plural connectors 803[21]~803[2m] and between the second DC powers VHI22~VHI2m and the plural connectors 803[21]~803[2m]. In a similar way, the protocol controller 804[x] is configured to operably generate the plural operation signals (not shown) to operate the plural switches 806[x], so as to determine electrical connection relationships between the first DC power VHIx1 and the plural connectors 803[x1]~803[xr] and between the second DC powers VHIx2~VHIxr and the plural connectors 803[x1]~803[xr].

Figure 11:
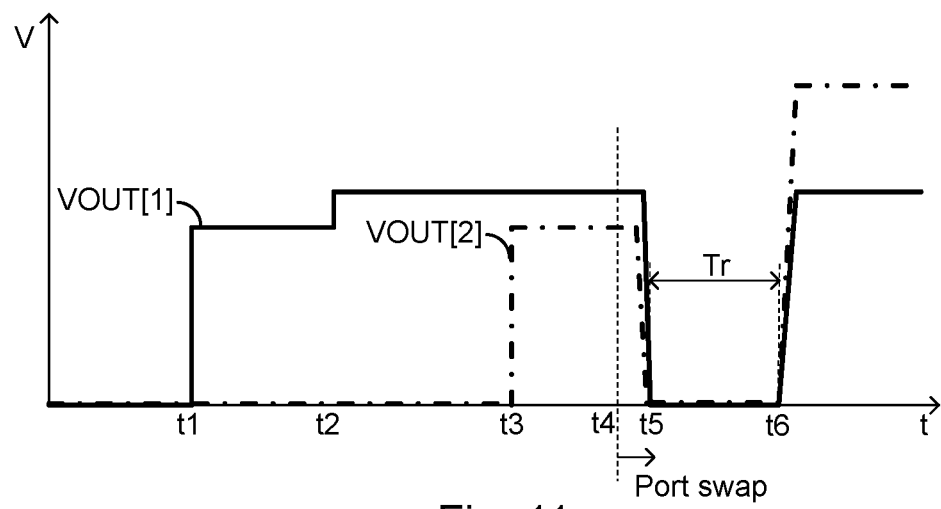
FIG. 11 illustrates a schematic waveform diagram of a multiple output universal serial bus travel adapter in accordance with one embodiment of the present invention.

FIG. 11 illustrates a schematic waveform diagram of a multiple output universal serial bus travel adapter in accordance with one embodiment of the present invention. Please refer to FIGS. 11 and 2. In one embodiment, when the protocol controller 204 detects that the output voltage VOUT[2] is higher than the output voltage VOUT[1], or the load power of the connector 203b is higher than the load power of the connector 203a, or the current flowing through the connector 203b is higher than the current flowing through the connector 203a, the protocol controller 204 is further configured to operably generate a reset signal Srst for performing port swap, and operate the plural switches 206 accordingly, so as to adjust output voltages VOUT[1] and VOUT[2] of the output powers to 0V during a reset time period Tr before the electrical connection relationships between the first DC power VHI1 and the connectors 203*a* and 203*b* and the electrical connection relationships between the second DC power VHI2 and the connectors 203*a* and 203*b* are determined. After the reset time period Tr, the second DC power VHI2 is enabled to be outputted to the connector 203*a*, and the first DC power VHI1 is enabled to be outputted to the connector 203*b*. In FIG. 11, for example, one mobile device is connected with the connector 203*a* at time point t1 and requests a voltage of 6V at time point t2, and another mobile device is connected with the connector 203*b* at time point t3 and requests a voltage of 9V at time point t4, whereat the port swap process is activated.

Figure 12:
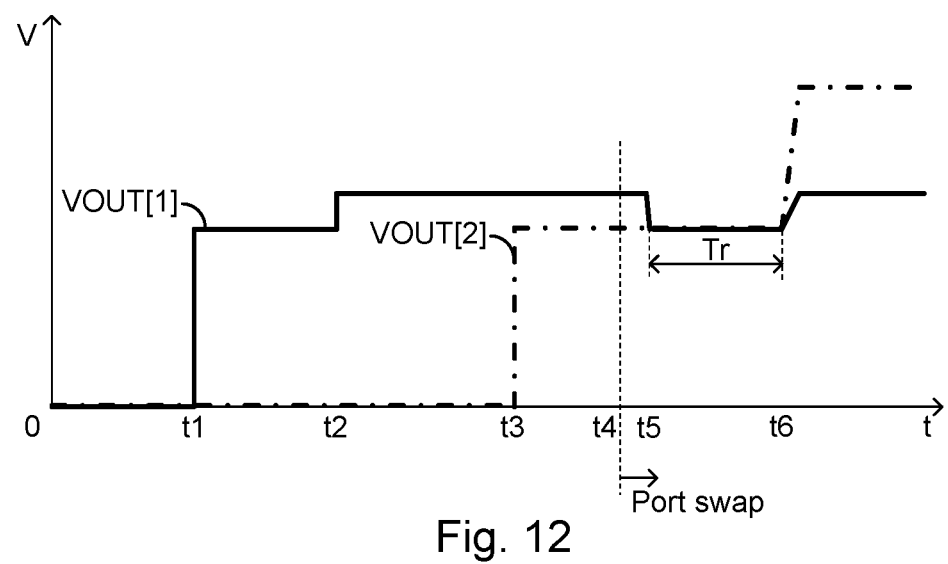
FIG. 12 illustrates a schematic waveform diagram of a multiple output universal serial bus travel adapter in accordance with another embodiment of the present invention.

FIG. 12 illustrates a schematic waveform diagram of a multiple output universal serial bus travel adapter in accordance with another embodiment of the present invention. Please refer to FIGS. 12 and 2. In another embodiment, when the protocol controller 204 detects that the output voltage VOUT[2] is higher than the output voltage VOUT [1], or the load power of the connector 203*b* is higher than the load power of the connector 203*a*, or the current flowing through the connector 203*b* is higher than the current flowing through the connector 203*a*, the protocol controller 204 is further configured to operably generate a reset signal Srst for performing port swap, and operate the plural switches 206 accordingly, so as to adjust output voltages VOUT[1] and VOUT[2] of the output powers to a predetermined level during a reset time period Tr before the electrical connection relationships between the first DC power VHI1 and the connectors 203*a* and 203*b* and the electrical connection relationships between the second DC power VHI2 and the connectors 203*a* and 203*b* are determined. After the reset time period Tr, the second DC power VHI2 is enabled to be outputted to the connector 203*a*, and the first DC power VHI1 is enabled to be outputted to the connector 203*b*.

The present invention has been described in considerable detail with reference to certain preferred embodiments thereof) It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e), the signal can be processed by a voltage-to-current conversion, a current-to-voltage conversion, and/or a ratio conversion, etc) before an action is performed) In view of the foregoing, the spirit of the present invention should cover all such and other modifications and variations, which should be interpreted to fall within the scope of the following claims and their equivalents.

What is claimed is:

1. A multiple output universal serial bus travel adaptor comprising:
   at least one AC-DC converter, wherein the AC-DC converter is configured to operably convert an AC power to a first DC power;
   at least one DC-DC converter coupled to the AC-DC converter, wherein the DC-DC converter is configured to operably provide a second DC power according to the first DC power;
   a plurality of connectors which are configured to operably receive the first DC power or the second DC power, so as to provide an output power to at least one mobile device connected with at least one of the connectors;
   a plurality of switches which are coupled to the at least one AC-DC converter and/or the at least one DC-DC converter and are configured to operably provide the first DC power or the second DC power to the corresponding connectors according to corresponding operation signals; and
   a protocol controller coupled to the switches, wherein the protocol controller is configured to operably generate the operation signals according to at least one of the following parameters so as to operate the plural switches, and to determine electrical connection relationships between the first DC power and the connectors and between the second DC power and the connectors:
   a) types of the connectors;
   b) whether there is a mobile device connected with the connector;
   c) a first command from the at least one mobile device;
   d) power consumed by the at least one mobile device;
   e) currents flowing through the connectors; and
   f) voltages at the connectors;
   wherein the AC-DC converter provides an internal power for the DC-DC converter.

2. The adapter of claim 1, wherein the connectors are Type-A universal serial bus or Type-C universal serial bus.

3. The adapter of claim 1, wherein the AC-DC converter includes a flyback converter.

4. The adapter of claim 1, wherein the DC-DC converter includes a step-down converter or a step-up/down converter.

5. The adapter of claim 1, wherein the protocol controller is further configured to operably control the AC-DC converter to dynamically adjust the first DC power according to a second command from the at least one mobile device.

6. The adapter of claim 1, wherein the protocol controller is further configured to operably control the DC-DC converter to dynamically adjust the second DC power according to a third command from the at least one mobile device.

7. The adapter of claim 1, wherein the protocol controller is integrated in the AC-DC converter or the DC-DC converter.

8. The adapter of claim 1, wherein the protocol controller is further configured to operably generate a reset signal to operate the switches, so as to adjust an output voltage of the output power to a predetermined level or 0V during a reset time period before the electrical connection relationships between the first DC power and the connectors and between the second DC power and the connectors are determined.

9. A control method of a multiple output universal serial bus travel adapter, the control method comprising:
   converting an AC power to a first DC power;
   providing a second DC power according to the first DC power;
   providing a plurality of connectors which are configured to operably receive the first DC power or the second DC power, so as to provide an output power to at least one mobile device connected with at least one of the connectors;

operating a plurality of switches according to corresponding operation signals, so as to provide the first DC power or the second DC power to the corresponding connectors; and generating the operation signals according to at least one of the following parameters so as to operate the switches, and to determine electrical connection relationships between the first DC power and the connectors and between the second DC power and the connectors:

a) types of the connectors;
b) whether there is a mobile device connected with the connector;
c) a first command from the at least one mobile device;
d) power consumed by the at least one mobile device;
e) currents flowing through the connectors; and
f) voltages at the connectors.

10. The method of claim 9, wherein the connectors are Type-A universal serial bus or Type-C universal serial bus.

11. The method of claim 9, wherein the step of providing a second DC power according to the first DC power includes a step-down conversion step or a step-up/down conversion step.

12. The method of claim 9, further comprising: converting the AC power to the first DC power according to a second command from the at least one mobile device, so as to dynamically adjust the first DC power.

13. The method of claim 9, further comprising: converting the first DC power to generate the second DC power according to a third command from the at least one mobile device, so as to dynamically adjust the second DC power.

14. The method of claim 9, further comprising: generating a reset signal to operate the switches, so as to adjust an output voltage of the output power to a predetermined level or 0V during a reset time period before the electrical connection relationships between the first DC power and the connectors and between the second DC power and the connectors are determined.

* * * * *